F. B. CONVERSE.
MACHINE FOR MAKING CORD TIRES.
APPLICATION FILED NOV. 27, 1915.

1,319,695.

Patented Oct. 28, 1919.
11 SHEETS—SHEET 1.

Inventor
F. B. Converse
By his Attorney
Robert M. Pierson

F. B. CONVERSE.
MACHINE FOR MAKING CORD TIRES.
APPLICATION FILED NOV. 27, 1915.

1,319,695.

Patented Oct. 28, 1919.
11 SHEETS—SHEET 2.

Inventor
F. B. Converse
By his Attorney
Robert M. Pierson

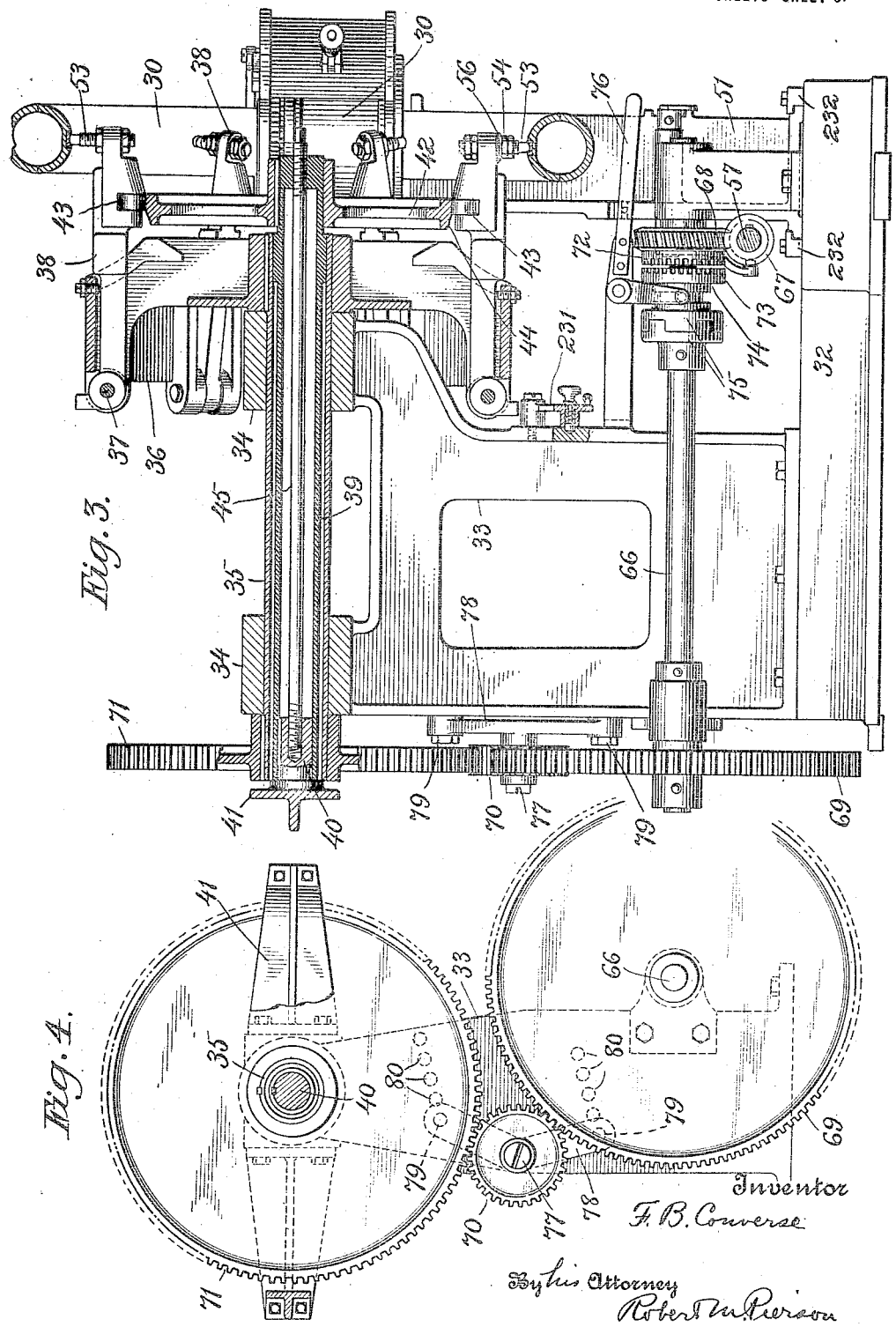

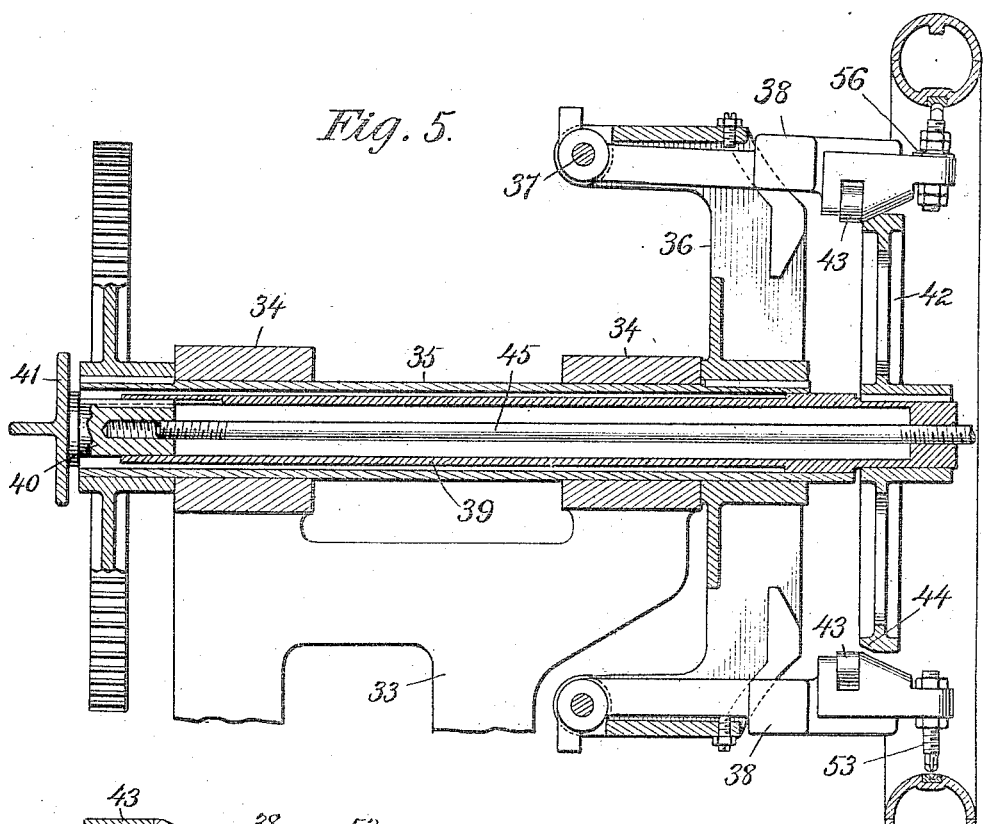
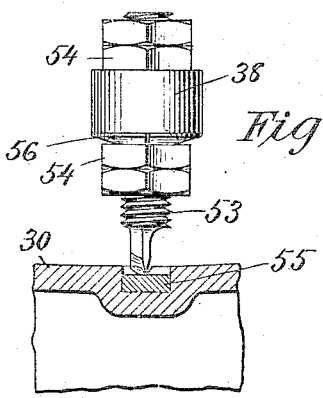
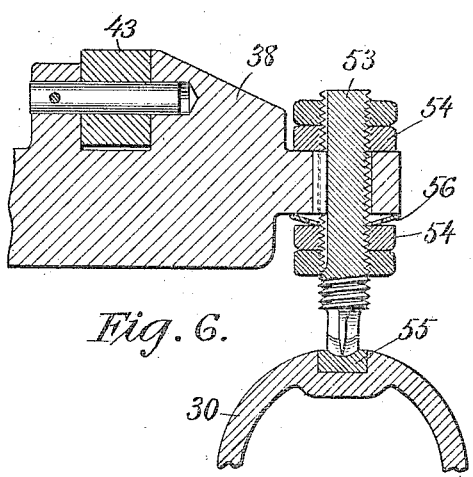
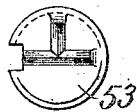
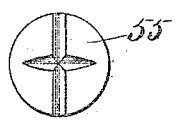

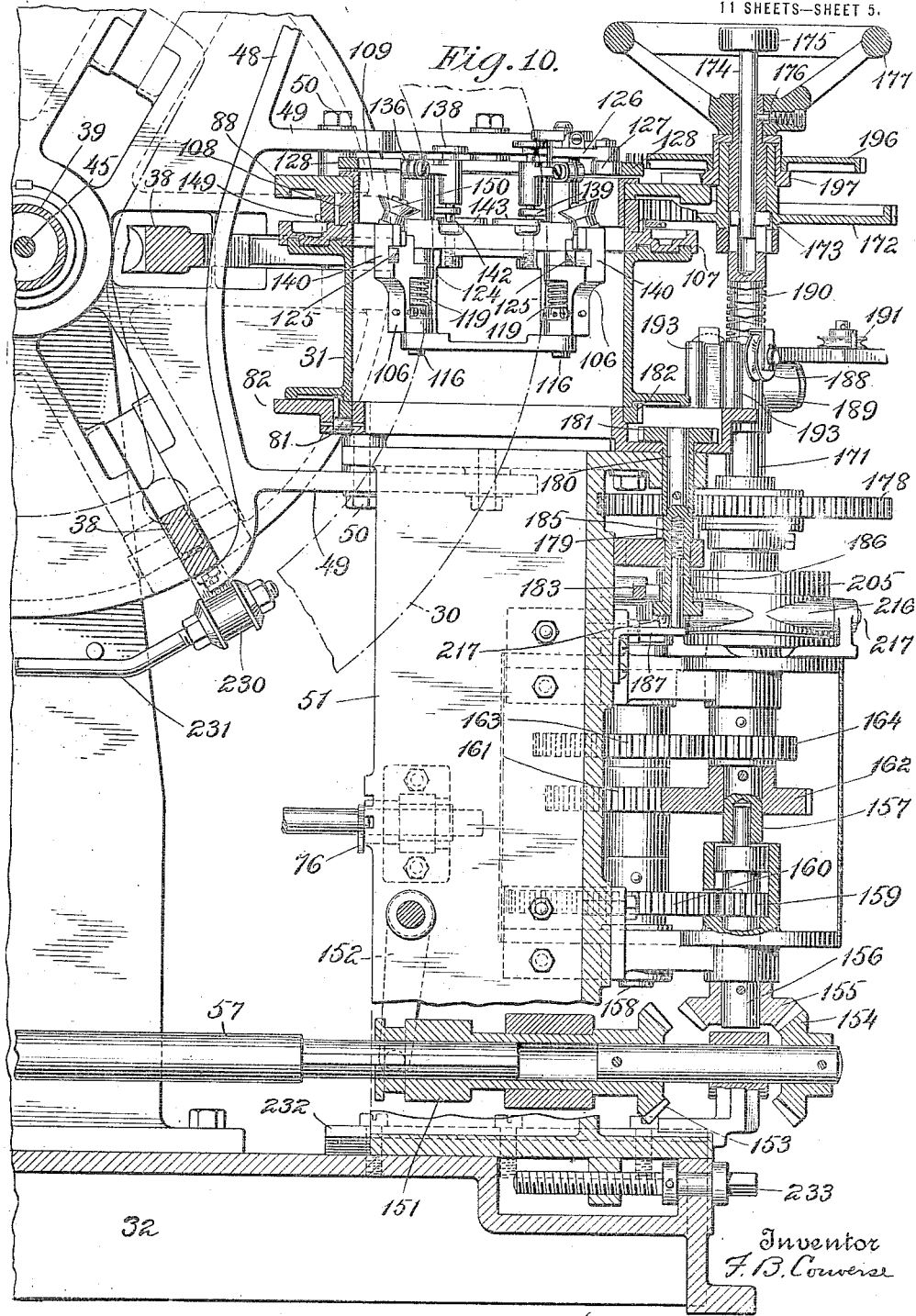

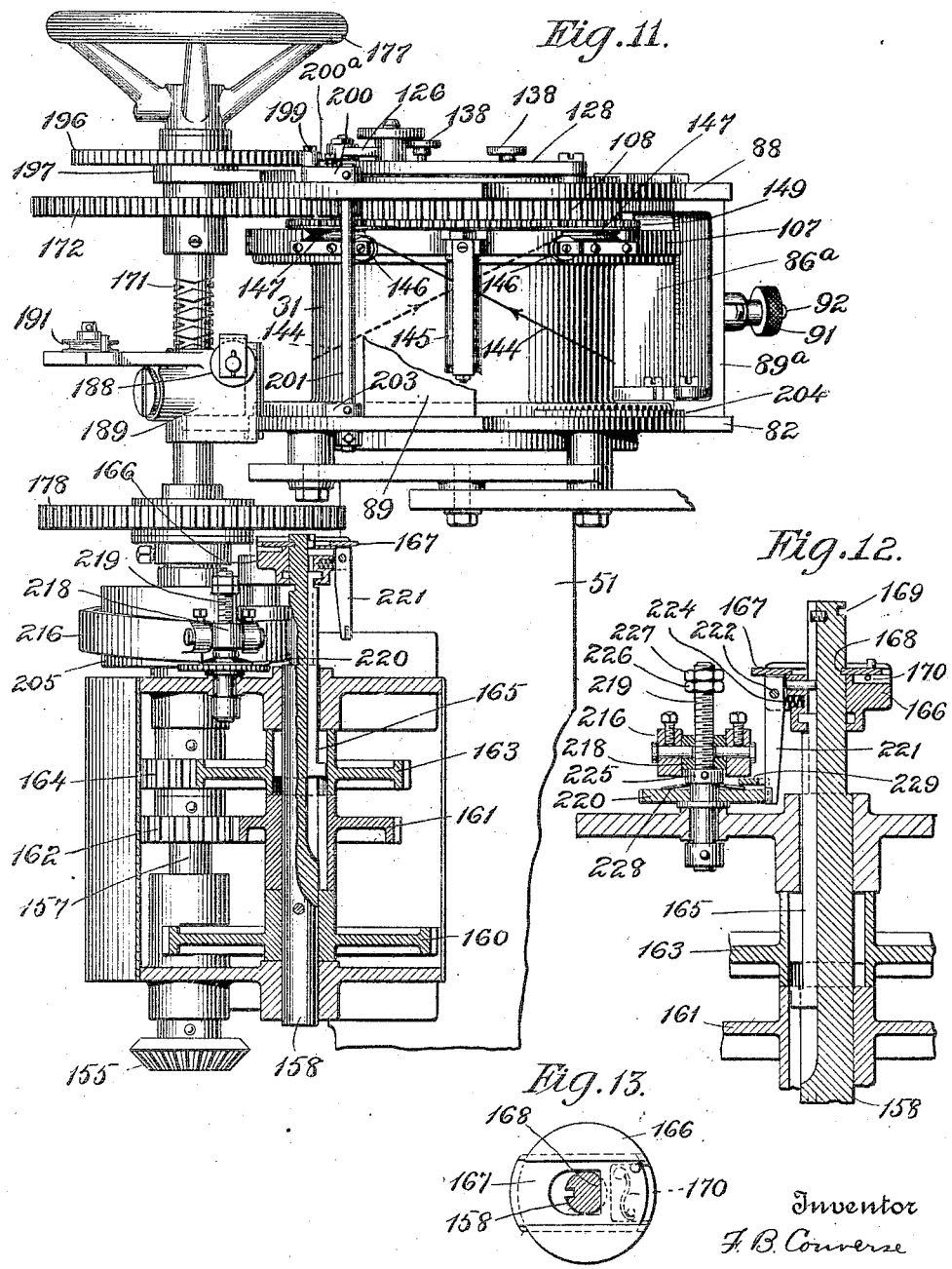

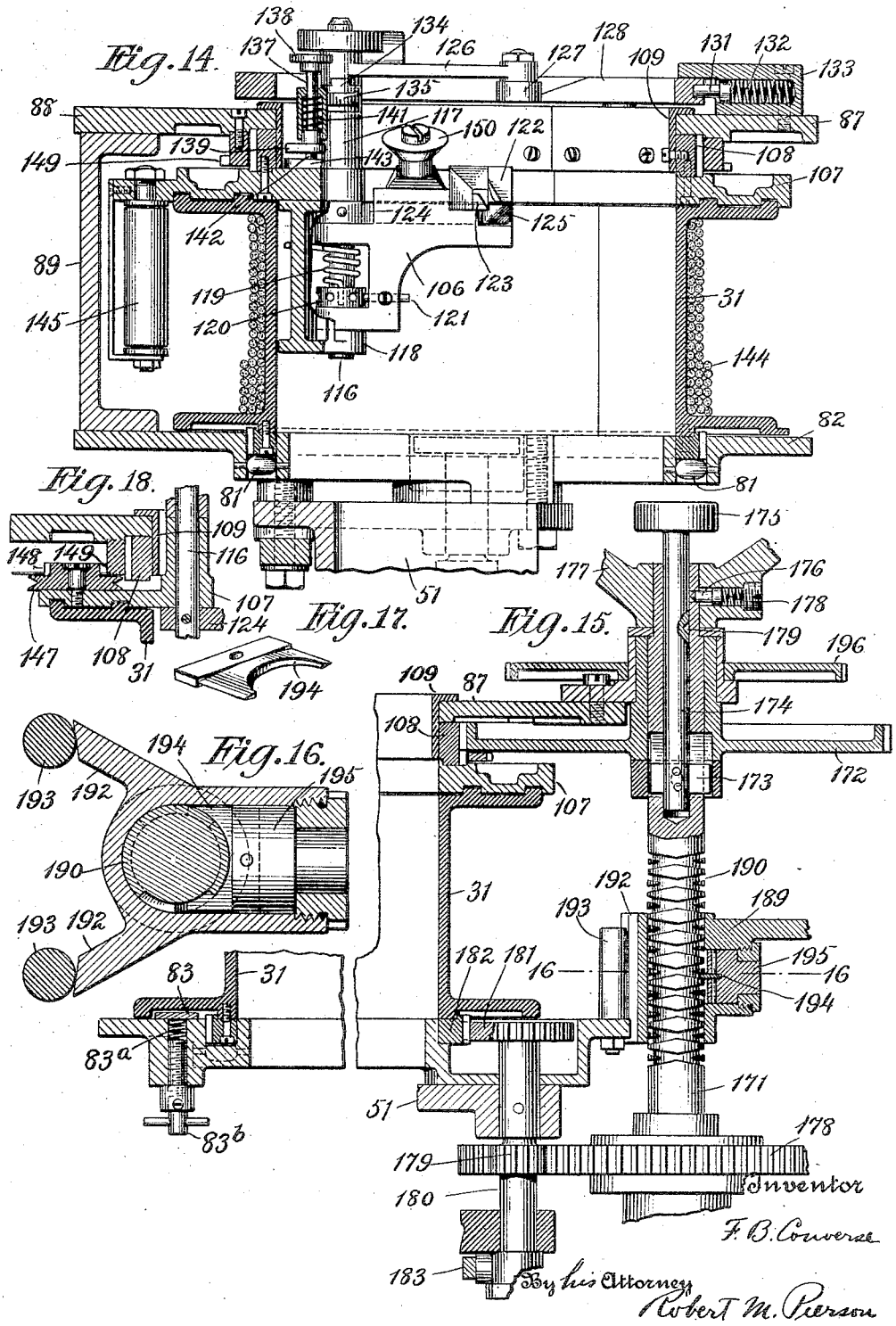

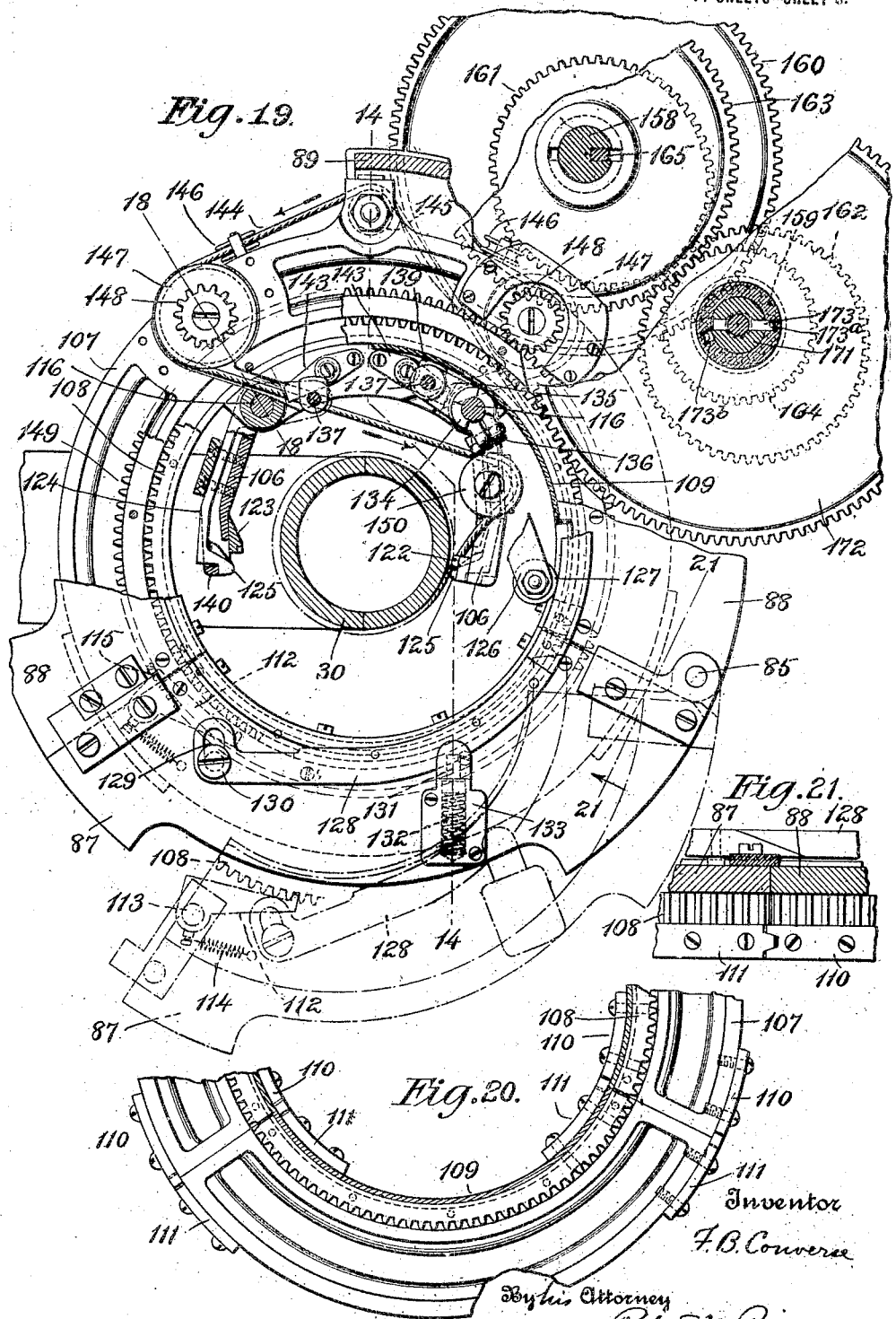

F. B. CONVERSE.
MACHINE FOR MAKING CORD TIRES.
APPLICATION FILED NOV. 27, 1915.

1,319,695.

Patented Oct. 28, 1919.
11 SHEETS—SHEET 9.

Inventor
F. B. Converse
By his Attorney
Robert M. Pierson

F. B. CONVERSE.
MACHINE FOR MAKING CORD TIRES.
APPLICATION FILED NOV. 27, 1915.

1,319,695.

Patented Oct. 28, 1919.
11 SHEETS—SHEET 10.

Inventor
F. B. Converse
By his Attorney
Robert M. Pierson

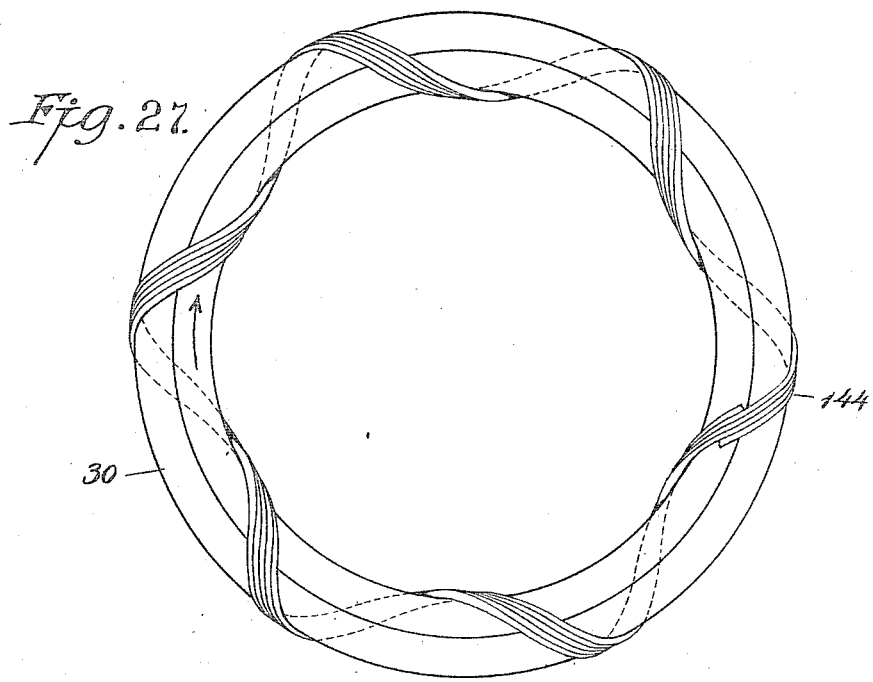
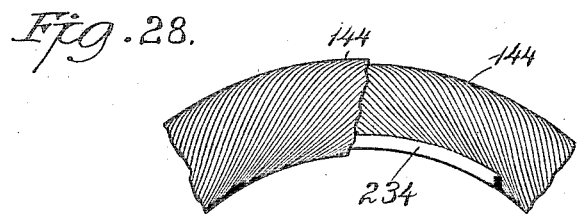
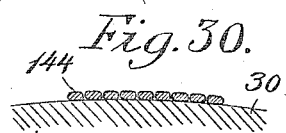
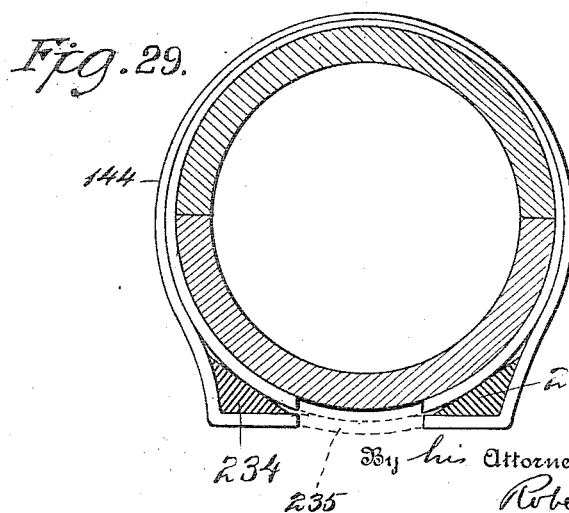

UNITED STATES PATENT OFFICE.

FRANCIS B. CONVERSE, OF AKRON, OHIO, ASSIGNOR TO THE B. F. GOODRICH COMPANY, OF NEW YORK, N. Y., A CORPORATION OF NEW YORK.

MACHINE FOR MAKING CORD TIRES.

1,319,695.     Specification of Letters Patent.     Patented Oct. 28, 1919.

Application filed November 27, 1915. Serial No. 63,731.

*To all whom it may concern:*

Be it known that I, FRANCIS B. CONVERSE, a citizen of the United States, residing at Akron, in the county of Summit and State of Ohio, have invented certain new and useful Improvements in Machines for Making Cord Tires, of which the following is a specification.

This invention relates to machines for winding a flexible cord or band on an annular mandrel, and particularly for laying the carcass of a cord tire by the continuous or round-and-round as distinguished from the back-and-forth winding method.

Among the objects of my invention are the provision of improved means for positively supporting and rotating the core or mandrel; automatically retracting the supporting devices in passing the winding point and automatically restoring the same to operative position; collectively retracting or projecting said devices for changing mandrels; laying the adjacent turns of cord with an exact or predetermined spacing so as accurately to fill up the surface of the core; laying said cord in a true annular helix; spacing the strands on the inner side of the mandrel in such a manner as to allow for slippage or creeping of the inner portions of the strands; flattening the cord in the outer or tread wall of the carcass; automatically feeding the cord from the spool to the mandrel; storing or loading the cord on the spool from an external source of supply; and automatically counting the number of turns thus stored on the spool.

Further and incidental objects accomplished by the invention will appear in the succeeding description.

Of the accompanying drawings,

Fig. 3 represents a vertical longitudinal section on the line 3—3 of Fig. 1.

Fig. 4 represents a view of the gearing at the rear side of the machine.

Fig. 5 represents a vertical longitudinal section illustrating the retraction of the chuck arms to release the mandrel.

Fig. 6 represents a detail section, and Fig. 7 an end view, of one of the mandrel-supporting arms and pin, together with a portion of the mandrel.

Fig. 8 represents an end view of one of the mandrel-supporting pins, and Fig. 9 a plan view of the complemental inset member in the mandrel.

Fig. 10 represents a vertical sectional view of the winding mechanism and adjacent parts as viewed from the front of the machine.

Fig. 11 represents an elevation of the same partly in section, as viewed from the rear.

Fig. 12 represents a detail vertical section of a sliding key embodied in the winder drive, and the feed for the cord-slip compensator.

Fig. 13 represents a horizontal section showing the latch for the key-controlling knob.

Fig. 14 represents a vertical section on the line 14—14 of Fig. 19, showing the cord spool, one of the cord-laying fingers and cord flatteners, and related parts.

Fig. 15 represents a vertical section on the line 15—15 of Fig. 22 showing the mechanism involved in storing the cord upon the spool.

Fig. 16 represents a section on the line 16—16 of Fig. 15.

Fig. 17 represents a detail perspective view of the screw-thread-engaging member in the distributer of the cord-storing mechanism.

Fig. 18 represents a detail vertical section showing the positively-rotated automatic cord-feeding pulley.

Fig. 19 represents a plan view partly in section showing the winding mechanism.

Fig. 20 represents a plan view, partly in section, showing the movable segment in the cord-laying arm plate and gear.

Fig. 21 represents a section on the line 21—21 of Fig. 19.

Fig. 27 represents an elevation showing a partly-wound layer of cord on the mandrel.

Fig. 28 represents a side elevation of a segment of the tire carcass with the outer cord layer partly broken away.

Fig. 29 represents a transverse section of the tire carcass and mandrel.

Figs. 30 and 31 represent longitudinal sections showing the inner cord layer as it lies on the outer and inner surfaces of the mandrel respectively.

Figure 1:
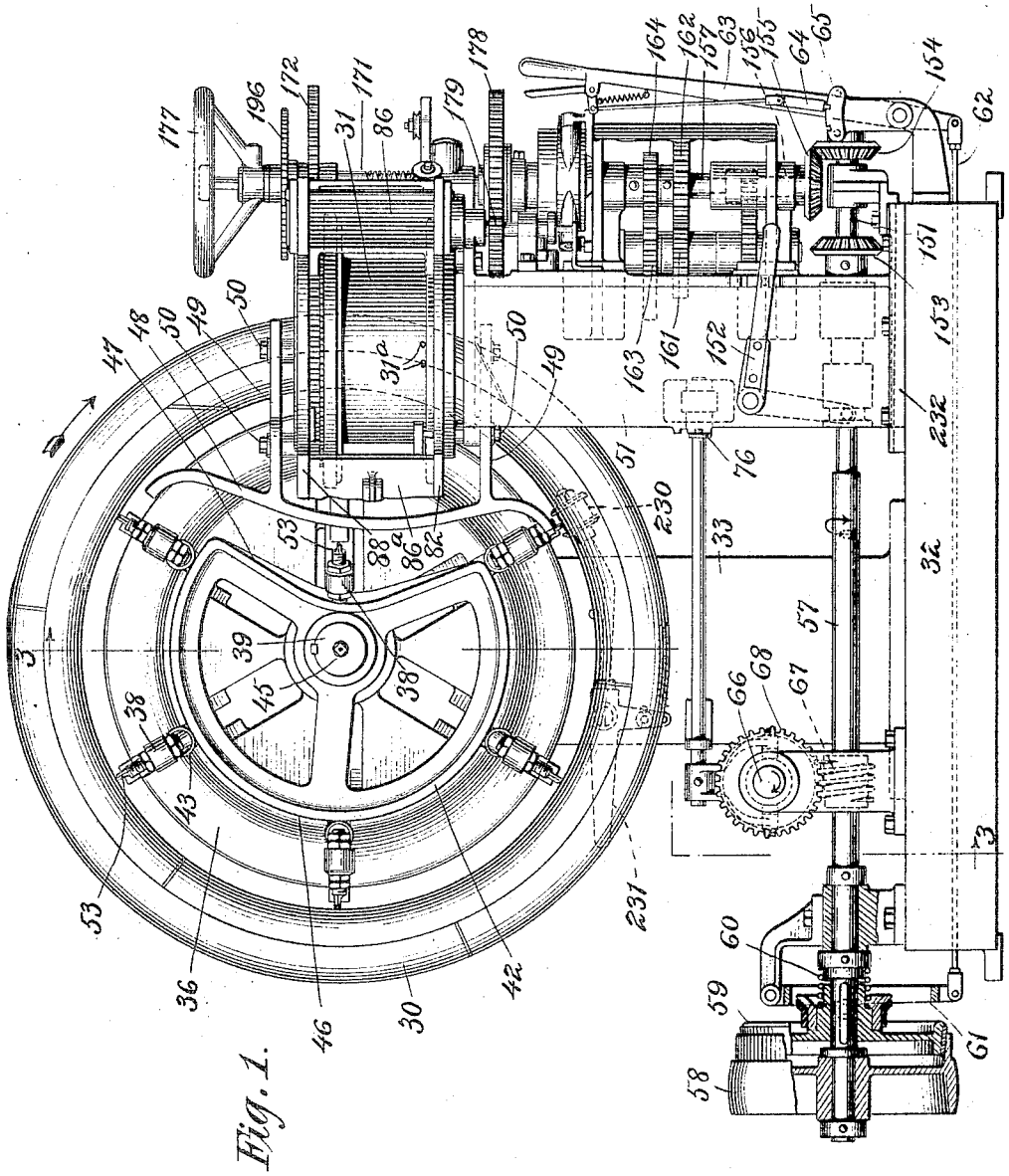
Figure 1 represents a front elevation of a cord-tire making machine constructed according to my invention, showing the mandrel in position.

Referring now in detail to the drawings, 30 is the annular core or ring-mandrel, and 31 is the hollow spool, reel or bobbin encircling one limb, from which the cord is wound onto the mandrel. The mandrel is preferably split into segments, as indicated in Fig. 1, and the segments bolted together in any suitable manner so that it may be taken out of the carcass after the latter has been completed and cut open. Any suitable cord or band may be used, and wound in any desired number of plies, although it is preferred to make a two-ply tire with the strands of the successive plies laid diagonally in opposite directions, and to use a rubberized cord of relatively large section and somewhat compressible, so that the strands may be compacted on the inner side of the mandrel and flattened or spread out circumferentially on the tread side. For example, it may be a hollow cord made by cabling together, through a suitable die, a number of rubberized smaller cords or threads, each in turn made up of smaller rubberized yarns twisted together.

*Supporting and revolving the mandrel.*

32 is the base casting and 33 a standard thereon having bearings 34 for a horizontal hollow shaft 35 to whose front end is keyed a chuck-head 36, and on this are pivoted at 37 a series of six chuck-arms 38 for supporting the mandrel, these arms being projected and retracted in radial planes to engage and release the mandrel.

Within the shaft 35 is a non-rotating hollow shaft 39 splined at its rear end to a stud 40 on a fixed frame member 41, and at its front end carrying a cam 42 for controlling the chuck-arms, the latter having rollers 43 bearing against the cam. The cam has a beveled rear surface 44 and its shaft 39 is axially movable by means of the screw-rod 45 whose rear end has threaded engagement with the fixed stud 40 and its front end an oppositely-pitched threaded engagement with the shaft 39, the rod 45 having a squared outer end to which a wrench may be applied. When the cam 42 is in its rearmost position, as shown in Fig. 3, the chuck arms are projected so as to hold the mandrel concentric with the chuck shaft, and when said cam is drawn forward as shown in Fig. 5 it allows the chuck arms collectively to collapse or lose their inward radial support on the full part of the cam, so that the mandrel may be removed.

Figure 2:
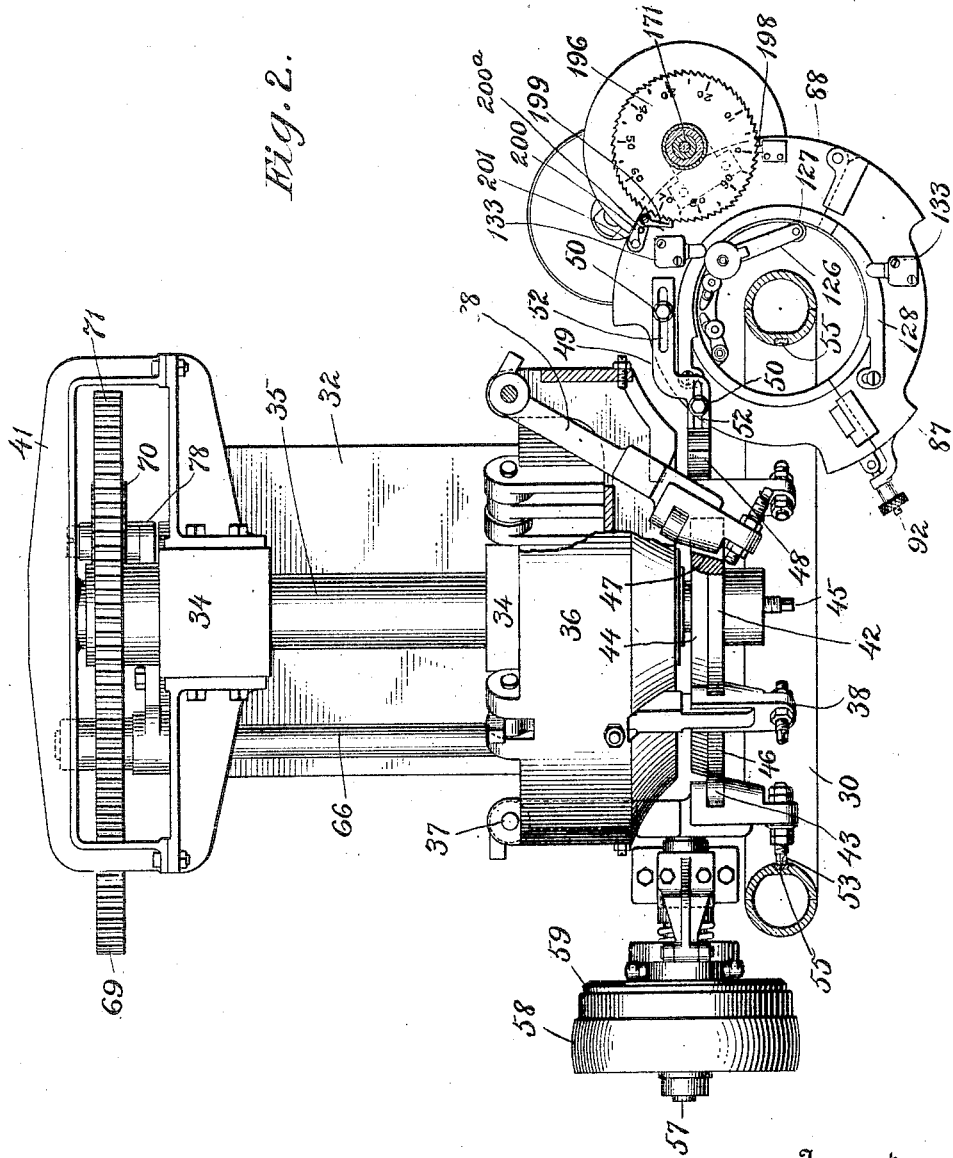
Fig. 2 represents a top plan view thereof, partly in section.

During the winding operation the cam 42 releases the chuck arms successively as they pass the winding point and permits them to fall inwardly to avoid striking the incasement of the winding spool, and for this purpose it is shaped as represented in Fig. 1 with a concentric face 46 of such length as to support at least four (or two-thirds) of the arms in their outermost position, and a receding face 47 which allows the arms to withdraw successively in passing the winding point. The chuck arms tend to fall inwardly by gravity in traversing the receding cam face 47 as long as they are substantially above the median horizontal plane. To assist such inward movement and also to maintain the arms retracted as they pass below that plane and until they again reach the concentric cam face 46, I provide on the outer side of the path of said arms opposite the receding cam face, a suitable curved guide or guard 48 acting as an outer cam member and having supporting arms 49 attached by bolts 50 to a frame standard 51. This standard is adjustable radially of the mandrel to allow for changing to a mandrel of different diameter, the arms 52 being slotted as shown in Fig. 2 so that the guide 40 may be kept at its proper distance from the cam 42.

The immediate points of support and driving engagement between the chuck arms and mandrel are furnished by pins 53 mounted radially in the ends of the arms and shown in detail in Figs. 6, 7, and 8. The pins are screw-threaded and clamped to the arms by nuts 54 and also splined thereto so as to prevent them from turning, whereby said pins may be adjusted in a radial direction. This adjustment allows for mandrels of different sizes and it is further possible to change the pins to ones of greater length for the largest mandrels within the capacity of the machine. I prefer to recess the inner surface of the mandrel at points registering with the chuck pins 53 so as to insure a positive driving connection between the chuck and mandrel and may use hardened inset pieces or driving members 55 in the mandrel at these points as represented in Figs. 6, 7 and 9. I have shown the pins 53 with T-shaped chisel ends and the inset pieces 55 as complementally recessed in order that, as the cords are laid across the driving members on the mandrel, the chuck-pins may press through the cords and reach the mandrel surface, but this feature is not essential, as, with blunt-pointed pins and recesses in the mandrel, a sufficiently positive driving connection may still be obtained, the pins indenting the cord or spreading the strands sufficiently for the purpose. In either case, however, it is desirable that the cam 42 shall not produce an absolutely rigid projection of opposite chuck points against the mandrel, and I therefore provide a yielding connection at some suitable point in the chuck or its operating mechanism. As shown in the drawings, the chuck arms are furnished with spring washers 56 for backing the outer nuts 54 on the pins 53 for this purpose, but the yielding connection may be located at any other suitable point.

The number of chuck-arms is conveniently made the same as the number of turns made by the cord in completing a circuit of the mandrel—six in this instance—and the chucking places on the mandrel form suitable starting and registering points for the first strand. To locate the mandrel so that any one of these points will register with the cord-laying finger in the winding mechanism, I provide an annularly-grooved stop 230 (Figs. 1 and 10) mounted on a hand-lever 231 by which it may be moved into and out of engagement with one of the chuck-arms 38.

While the above-described arrangement of chuck arms, together with means for automatically retracting and projecting the same as they revolve, is believed to be novel, and could be employed with any suitable mandrel-gripping means, not necessarily of a positive nature, it is to be observed that by positively driving the mandrel and (as hereinafter described) interconnecting its driving means positively with the winding mechanism, I provide for laying invariably the same number of turns of cord upon the mandrel, the number of turns depending upon the ratio of gearing employed between the mandrel shaft and the winder. Other types of mandrel-supporting and revolving mechanism could of course be employed within the scope of my invention.

*Mandrel driving gears.*

57 is the main driving shaft (Figs. 1, 2, 3 and 10) parallel to the front of the machine said shaft having on one end a belt pulley 58 provided with a friction clutch whose splined member 59 is projected by a spring 60 and retracted by a lever 61, link-rod 62, and a hand-lever 63 having a pawl 64 to engage with a notched segment 65.
66 is a shaft driven by worm gearing 67, 68 from the shaft 57 and connected at its rear end by spur gears 69, 70, 71 with the chuck shaft 35. Provision is made for stopping the rotation of the mandrel without stopping the drive-shaft 57, by interposing a positive clutch between shaft 66 and the worm gear 68, one member 72 of said clutch being formed on the hub of the worm gear, and the other member 73 being formed on a sliding sleeve 74 connected with shaft 66 by a coupling 75 having relatively slidable inter-fitting jaws as shown in Fig. 13. A hand lever 76 is provided for shifting the sleeve 74 to connect and disconnect the clutch members 72, 73.

In designing the machine, a ratio of gearing between the winder and the chuck shaft 35 is selected such that the winder makes a predetermined number of revolutions for one revolution of the mandrel and wraps the cord in a corresponding number of turns upon the mandrel in making one complete circuit of the latter. I have selected a ratio of 6:1 because this gives a desirable angle to the cords, and the cord takes six turns about the mandrel before repeating, as seen in Fig. 27. After one strand is laid around a complete circuit of the mandrel, the next one has to be pitched ahead by an amount equal to the desired spacing of the strands, and this is accomplished by selecting the proper ratio between the number of teeth in the gear 69 and the number in the gear 71, so that for one rotation of the shaft 66, the mandrel chuck-shaft 35 will make one rotation plus the desired angular distance or pitch-spacing between two adjacent turns of cord. But the total number of turns of cord in a single ply of the carcass varies with the different sizes of tires, and as the pitch-spacing remains constant, it is a variable function of the mandrel circumference. As I find it an advantage to provide for making different sizes of tires on the same machine, the gears 69, 70, 71 are changed for each different diameter of mandrel. The selected diameter of each of the gears 69, 71 varies with the diameter of the mandrel, and the intermediate gear 70 is shifted to keep in mesh with them, its journal stud 77 being carried by a bracket 78 having bolts 79 at its two ends adapted to occupy different holes 80 in the frame standard 33.

*Winder.*

The mandrel 30 is here arranged to revolve always in a clockwise direction as viewed from the front of the machine.
The annular parts of the winder embrace the right-hand or descending limb of the mandrel, and are arranged to revolve in either direction, so that succeeding plies of the carcass may be laid with their strands running diagonally in opposite directions as indicated in Fig. 28. The cord spool, the winder casing, the annular plate or ring which carries the cord-laying arm, its gear, the spool gear, and the cam for the cord-flattening member are all made in segments so that they can be opened to admit the passage of the mandrel when it is being inserted in or removed from the machine, the appropriate segments being first lined up or registered.

Figure 22:
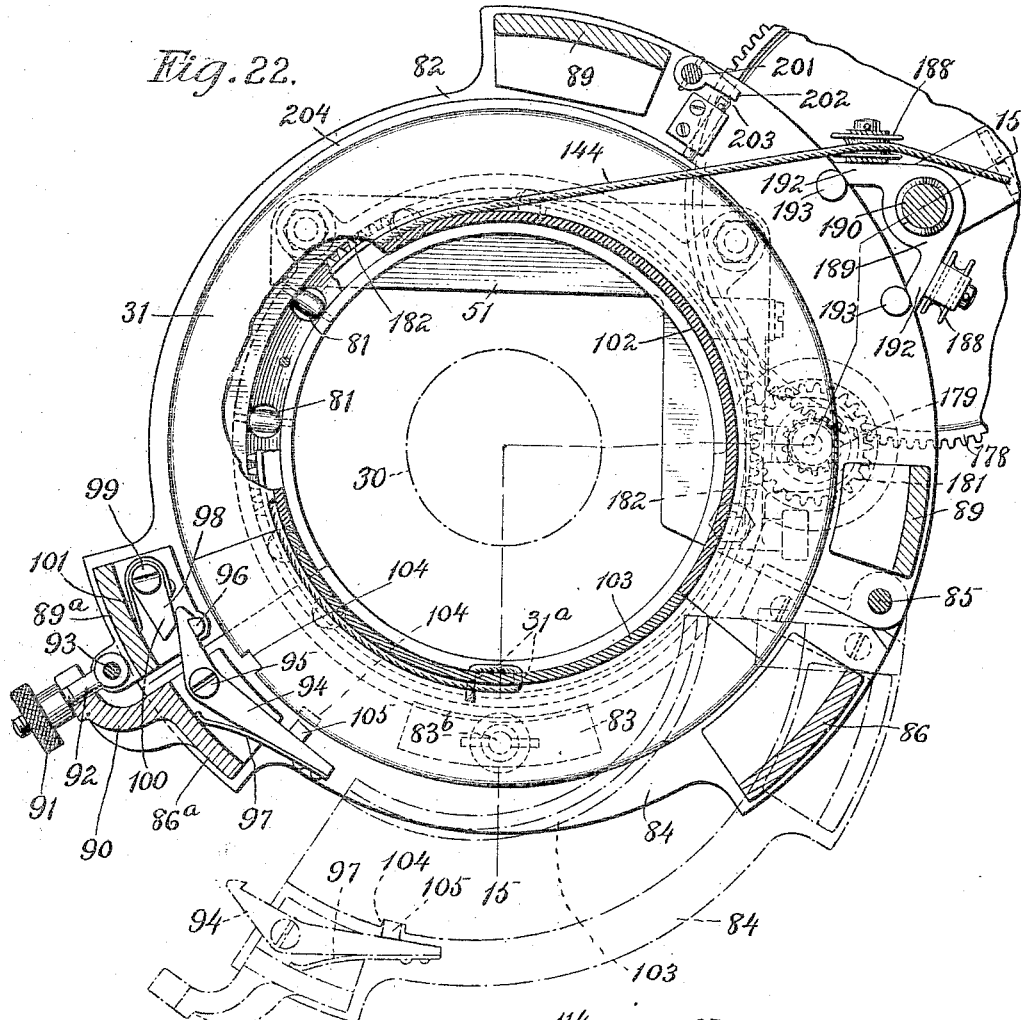
Fig. 22 represents a plan view partly in section, showing the spool and its casing, and indicating the mode of latching the movable segments thereof.
Figure 23:
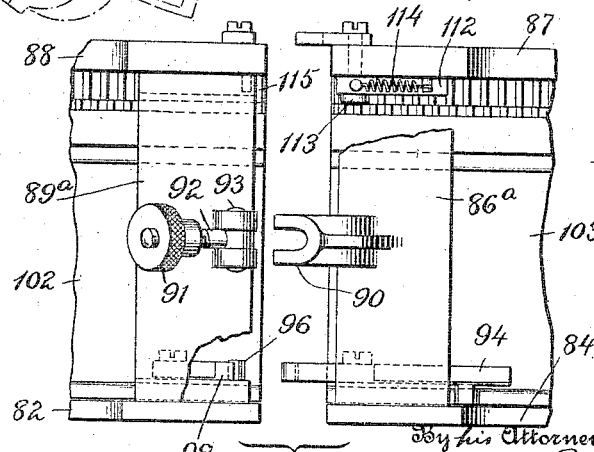
Fig. 23 represents an elevation of the same, showing the latched parts slightly separated.

The cord spool 31, during the winding operation, turns loosely on bearing rollers 81 (Figs. 10, 14 and 22) in the lower plate 82 of the winder casing, which is mounted at the upper end of the winder stand 51. A brake-plate 83 (Figs. 15 and 22), backed by a spring 83$^a$ and an adjustable screw plunger 83$^b$ furnishes a retarding friction for the spool. Plate 82 has a segment 84 (Figs. 22 and 23) hinged at 85 to the fixed part of the plate, and connected by risers 86, 86$^a$ with a similar segment 87, (Figs. 19 and 23) forming a part of the top plate 88 of the winder casing, the fixed members of the top and bottom plates being connected by the risers 89, 89$^a$. To secure the hinged segment of the casing in closed relation with the fixed segment there is provided, as seen in Figs. 22 and 23, a forked tongue 90 on the riser 86$^a$ engaged by a thumb-nut 91 on a bolt 92, hinged at 93 to the riser 89$^a$. The ends of the two segments are also connected in closed relation by a latch-pawl 94, pivoted at 95 to the hinged segment of the casing, and engaging a keeper 96 on the fixed segment. This pawl has a spring 97 tending to release it, and it is automatically engaged with its keeper by the closing movement of the segment through the action of a cam dog 98, pivoted at 99 to the fixed segment and having a beveled end 100 for displacing the toe of the pawl inwardly, said dog having a spring 101 strong enough to overcome the spring 97. The spool 31 is divided in vertical planes into long and short segments 102, 103 corresponding in angular extent to the fixed and hinged segments of the casing, and it is necessary to line up the division planes of the casing and spool before they can be opened. In order to prevent the casing from being opened or started open at other times, I control the release of pawl 94 from its keeper 96 by the rotary position of the spool 31. The lower flange of the short segment 103 of said spool has a notch 104, and the heel of pawl 94 has a projection 105 to enter said notch. When the dividing planes of the spool are in the full-line positions represented in Fig. 22, the notch 104 is out of line with the projection 105, and the pawl cannot be released. When said notch assumes the dotted-line position, the operator by manually pushing in the heel of the pawl may cause said projection to enter the notch and release the hooked toe of the pawl from the keeper 96, the dog 98 yielding to permit this action. The nut 91 being unscrewed and its bolt swung aside, the hinged segment of the casing, carrying with it the short segment of the spool and also certain gear segments hereinafter referred to, may be opened out as represented in Fig. 23 and by dotted lines in Figs. 19 and 22, thus allowing the mandrel 30 to be inserted or removed. The spring 97 maintains the locking engagement between the members 104, 105 so as to preserve the alinement of the parts.

106 is the cord-laying arm, of which two are provided for alternate use in winding the successive plies, said arms being pivotally mounted on the inner periphery of an annular plate or ring 107. This ring has screwed on top of it an annular spur gear 108 which in turn is rotatably suspended in the top plate 88 of the winder casing by a flanged sleeve or journal 109. The ring 107, gear 108, and sleeve 109 are divided vertically in the same manner as the casing and spool, and the short segments thereof are adapted to be carried by the hinged segment of the casing when the latter is opened out. Fig. 20 shows the dividing planes of these parts, which, when lined up with those of the casing and spool, allow the winder to be opened. The vertical alinement of the ends of the two segments of each of the parts 107, 108, 109 is preserved in the closed position of the winder by groove-and-tenon plates 110, 111. To keep the short segments in angular registry with those of the casing and spool when the winder is opened, there is provided an automatic latch-pawl 112 seen in Figs. 19 and 23, the same being pivoted to the casing-plate segment 87 at 113, and having a hooked end to engage between the teeth on the short segment of gear 108 under the impulse of a spring 114. When the casing is closed, the heel of this pawl engages an abutment 115 on the fixed segment of the upper casing plate 88, and causes the pawl to release the gear.

The two cord-laying devices being similar in construction and the same being true of the cord flatteners, a description of one will suffice. These parts are best shown in Figs. 10, 14 and 19. The cord-laying arm 106 loosely surrounds a vertical rock-shaft 116, loosely journaled in bearings 117, 118 on the carrying plate or ring 107, and it is yieldingly urged in the direction of the mandrel by a spring 119, whose tension is adjustable by a collar 120 and pin 121. At its free end, the arm 106 has a cord-laying finger or guide composed of the part or hook 122 which holds down the on-running strand of cord and guides it onto the core, at the same time compacting the cords edgewise on the inner side of the mandrel so as to lay the required number per inch to avoid wide spaces at the tread, and a radially-abutting part 123 adapted to rest against the previously-laid strand or turn of cord immediately below the one which is being laid, and thus prevent the part 122 from coming in contact with the sheet of rubber or fabric previously applied to the mandrel. The two cord-laying fingers are on about the same diameter of the winder, on opposite sides of the mandrel section.

There is also mounted on the rock-shaft 116 a cord-flattening arm 124, having at its free end a cord flattener 125, and to this arm a strong inward-turning pressure is applied while said member is rounding the tread portion of the mandrel, in order to flatten the cord at this place, as it is being laid, as clearly indicated in Figs. 19, 27, 29 and 30. Arm 124 is pinned to the rock-shaft 116 and the latter carries at its upper end an arm 126, having a roller 127 which, as the winder is revolved, operates intermittently against a semi-annular cam 128. The latter is divided along a diagonal plane as viewed from the side (see Fig. 21) into segments carried respectively by the movable and fixed segments of the top winder-casing plate 88, the ends of the cam being slotted at 129 and guided on pins 130, the segments being yieldingly backed by plungers 131 and springs 132 mounted in socket-pieces 133 (Figs. 2, 14 and 19). Any suitable modification of this means for intermittently applying a yielding inward pressure to the cord flattener may be employed. As there is only one cord flattener at a time in use, the arm 126 is made removable and transposable to the other rock-shaft 116, there being a jaw coupling 134 connecting the hub of the arm with an arm 135 whose hub 136 is a split collar clamped upon the shaft 116.

In a tubular guide formed on the end of arm 135 is mounted a rod 137 provided with a knob 138 at its upper end and a cam 139 near its lower end. By rotating the rod to turn the cam against the inner surface of sleeve 109, as shown in Fig. 19, the cord flattener 125 is held away from the mandrel and the parts 122, 123 of the cord-laying finger are also held away from the mandrel by the engagement of a shoulder on the back of the cord flattener with a shoulder 140 (seen at the left in Fig. 19) on the cord-laying arm 106, this being desirable in order to avoid contact between the cord-laying finger and the underlying rubber or fabric sheet when the first turn of cord is wound in place, there being no support for the part 123 until this first turn is laid. The rod 137 has a spring 141 to depress it, and its lower extremity 142 is adapted to engage the inner edge of a fixed plate 143, in order to hold the corresponding cord-laying and flattening devices altogether out of action as shown at the left in Fig. 19. When these devices are in action as shown at the right, the rod rests on top of said plate.

I have arranged the cord-laying devices in the machine as here represented so that a counter-clockwise rotaton of the winder as viewed from above (Fig. 19) lays the first or inner ply in a direction corresponding to a right-hand screw-thread (Fig. 27), and a clockwise rotation lays the next ply in the opposite direction, the mandrel revolving always clockwise as viewed from the front. While the same effect can be had by rotating the winder in one direction only and reversing the mandrel, I find the described arrangement to be preferable in that it permits a full view from above, of the action of the cord-laying and flattening devices as each turn of cord is being laid in all the plies, the cord being applied at the top of the wound portion as the latter recedes below the winding point.

*Cord guides and feeders.*

On leaving the spool 31 the cord 144 passes diagonally upward either to the right or left, as indicated by dotted and full lines in Fig. 11, according to whether a first or second ply is being laid, around a vertically-elongated cylindrical guide-roller 145, seen also in Figs. 14 and 19, which is mounted on ball bearings in a bracket upon the rotary carrying-ring 107. It then passes over either one of two grooved rollers 146 mounted on horizontal axes, and around the corresponding feeder-wheel or pulley 147 which is positively driven by a planetary gear pinion 148 affixed to it and meshing with the teeth of a stationary gear 149 attached by screws to the top plate 88 of the winder casing, this fixed gear being in segments the same as the other mandrel-encircling elements of the winder. From the feeder-wheel the cord passes through a suitable groove or opening in the carrier-plate 107 to and around an inclined mushroom-shaped guide-roller 150 journaled on that cord-laying arm 106 most remote from said feeder-wheel.

The periphery of the feeder-wheel 147 is grooved at such an angle as will cause it to grip the cord with the desired amount of friction, and its peripheral speed is substantially greater than the speed of the cord due to its take-up on the mandrel. The feeding action of the wheel is automatic, for if the spool by its momentum should tend to supply the cord faster than it is being laid, the cord will loosen in passing around the feeder-wheel, and more or less slip will occur until such time as the slack is taken up in the winding operation. On the other hand, if there should be an excess drag upon the spool, tending to over-strain the cord, the grip of the feeder-wheel thereon will be automatically tightened, and the rate of feed to the winder will be increased until the excess of tension is relieved.

Winder drive.

One of the features of the winder-driving mechanism here shown is the employment of a pair of eccentric gears for relatively increasing the speed of revolution of the cord-laying finger as it passes around the outer or tread face of the mandrel, and relatively decreasing its speed in passing around the inner face. This mechanism is employed when it is desired to lay the cord approximately in a true annular helix which follows the shortest line on the supporting surface between any two points in the course of a strand.

The main horizontal driving-shaft 57 has a telescopic end section 151 splined thereto and slidable by means of a hand lever 152 to bring the one or the other of a pair of bevel gears 153, 154 with which it is equipped into mesh with a mating bevel gear 155 on the lower end of a short vertical shaft-section 156, whereby the winder is driven in one or the other direction as desired (Figs. 1, 10 and 11). Mounted above and in line with shaft-section 156, is another vertical shaft-section 157 normally driven, through a counter-shaft 158, by a pair of plain spur gears 159, 160, and a pair of eccentric gears 161, 162, whereby the above-described fast and slow movement is imparted to the winder.

As the machine is also equipped to drive the spool 31 positively in order to store upon it a length of cord sufficient to form a tire carcass, and as I prefer to rotate the spool uniformly when thus storing the cord, another pair of spur gears 163, 164 of the plain or concentric type are mounted upon the respective shafts 158, 157 above the eccentric gears. The two gears 162, 164 are pinned to their shaft 157 and provision is made by means of a key 165 (Figs. 11 and 12) sliding vertically in a groove in the shaft 158, for alternately connecting the gears 161 and 163 to the last-said shaft, the gear 161 being shown as thus connected for normal operation in Fig. 12, and the gear 163 connected for storing the cord in Fig. 11. A knob or handle 166 is gibbed to the upper end of the sliding key and provided with a manually-retractable horizontal sliding latch-plate 167 adapted to enter notches 168, 169 in the shaft 158 to hold the key in its two positions, said plate being retained in the notches by a spring 170. The knob 166 is also provided with a feed-pawl 221 for a purpose hereinafter described.

The motion from shaft-section 157 is continued upwardly through a vertical shaft-section 171 in line therewith, and is transmitted from a gear 172 to the gear 108 which is fastened to the carrier plate 107 upon which the cord-laying or winding devices are mounted. In order to disconnect these winding devices from the driver when desired, I provide a key 173 (Figs. 10 and 15) mounted in slots in the shaft 171 for coupling the latter with and uncoupling it from the gear 172, this key being attached to the lower end of a vertically sliding rod 174 which has a knob or handle 175 at its upper end and is adapted to be retained in its upper or gear coupling position by a detent 176 mounted in the hub of a hand-wheel 177 and projected by a spring 178 so as to enter a notch 179 in the rod. The hand-wheel 177 is suitably keyed to the upper end of shaft 171 so as to rotate the latter and therethrough the gear 172 when coupled to said gear, and thus enable the cord-laying finger to be brought to any desirable position around the mandrel, or to line up the segments of the carrying plate 107 and its attached parts with those of the spool and winder casing when the latter is to be opened.

To accommodate the position of the winder to mandrels of different mean diameters, the standard 51 is slidable in guides 232 (Figs. 1, 3 and 10) on the base 32, by means of a screw 233, so as to move the cord-laying devices radially of the mandrel, and correspondingly shift all the mechanism supported by standard 51.

Spool loading mechanism.

For the operation of storing the cord from an external source of supply upon the spool 31, the gears 163, 164 are brought into action by the sliding key 165, as previously described, to rotate the spool uniformly; the winder-driving gear 172 is disconnected by means of key 173, and shaft 171 is connected to the spool by a gear-train (shown in Figs. 10, 15, 22, 24 and 25) comprising a spur gear 178 on shaft 171, a smaller spur gear 179 meshing therewith on a counter-shaft 180, a gear 181 on the upper end of the counter-shaft and an inter-meshing gear 182 made in segments fastened by screws to the lower ends of the segments of the spool 31. The counter-shaft 180 is slidable downwardly in its bearings to unmesh the gear pairs 178, 179 and 181, 182 by a hand-lever 183 having a locking-pin 184, the counter-shaft being raised into gear-meshing position by a spring 185 contained in a central bore in its lower portion and abutting against a plunger 186 which is stepped on a bracket 187. To prevent damage in case the spool should jam or if it should be left in gear with the power-shaft at the same time that the winder is geared thereto, I connect the gear 178 with its shaft 171 by a friction device 278 (Fig. 25) adjustable by means of a screw collar 279.

To guide the cord from the external source of supply onto the spool 31, it is led over a pully 191 (Figs. 10 and 11) and then over either one of two pulleys 188 mounted upon a distributer block or nut 189 to which a reciprocating vertical feed is imparted by a cross-thread screw 190 on the shaft 171 such as is commonly used in spool or cop winders (Figs. 10, 11, 15, 16 and 22). The nut is provided with vertically-elongated cheeks 192 engaged with complemental stationary guide pins 193 to keep it from rotating, and its connection with the screw 190 is effected by a segmental plate 194 (Figs. 16 and 17) mounted in a swivel 195· in order that said plate may follow either course of the thread 190 and automatically reverse at the extremes of movement of the nut. As here shown, the distributer reciprocates whenever the shaft 171 is running, even when not acting on the cord, although this is not essential.

The spool 31 has holes 31ª (Figs. 1 and 22) through which the cord is passed to fasten its end to the spool.

I further provide for automatically counting the number of turns stored upon the spool so that the operator, having previously determined how much is required for the particular tire carcass, may store only the necessary amount.

The parts of this counter are shown principally in Figs. 1, 2, 10, 11 and 22. 196 is a counter wheel mounted to turn loosely about the upper bearing 197 of gear wheel 172 and having ratchet teeth on its periphery engaged by a check-pawl 198 and also by a feed-pawl 199, the latter being pivoted on an arm 200 secured to the upper end of a rock-shaft 201, the lower end of this rock-shaft having an arm 202 engaging a pin 203 which is reciprocated radially by a cam 204 on the lower flange of the cord spool 31. A spring 200ª, mounted on the arm 200 and pressing against the pawl 199, urges the latter against the toothed wheel 196 and also, by reaction against the arm 200 it tends to turn the rock-shaft 201 in a direction causing the arm 202 to hold pin 203 against the cam. For every turn of the spool the counter wheel 196 is rotated the distance of one tooth, and the number of teeth is denoted by suitable markings on the upper surface of the wheel which register in succession with the left-hand edge of the check-pawl 198.

*Cord-slip compensator.*

Owing to the smaller circumference of the inner side of the mandrel as compared with the outer side, the strands of cord have to be crowded very closely together on the inside, with no crowding at the tread, illustrated graphically in the sections, Figs. 31 and 30. If the rotation of the cord-laying parts is accomplished by means of the eccentric gears 161, 162 previously described, so that the cords lie on the inner periphery of the core at substantially the same angle as on the tread instead of lying more nearly straight across the core as they would if the drive were through concentric gears, the crowding on the inner periphery tends to displace the inner portions of the first few strands that are laid, in each of the six sections (see Fig. 27) in the direction that the mandrel revolves, so that if the cord-laying finger should describe its true theoretical path around the mandrel there would be no room for the inner portion of the last turn in section, necessitating a considerable amount of hand-tooling and rearrangement of the strands in the vicinity of these last turns in order to finish the cord layer. I therefore find it desirable (when using the eccentric gears ) to introduce a mechanism whose effect will be to displace the circumferential position of the cord-laying finger on the inner periphery of the mandrel from its theoretical position, by successive small increments whose sum equals the total amount of slip, which ordinarily approximates the width of one strand of the cord on the inner periphery.

As there is no crowding of the cord on the tread portion and therefore no displacement of the cords at that point, the cord-laying finger must cross the tread in its true path, the successive increments being effective on the inner periphery only. Preferably this displacement of the cord is equally divided on opposite sides of the middle strand of each section—that is, the first-laid turn of cord will depart from a true helix, for example, by half the thickness of a strand in a direction opposite to the direction of revolution of the core, the departure in this direction will gradually decrease until the middle strand is laid in a true helical path, and it will accumulate in the opposite direction until the last-laid strand departs from the true helix on the inner side by half the thickness of a strand in the same direction that the core revolves, the net result being that the first few strands in each section, by slipping in the direction of revolution the thickness of one strand on the inner side, will depart from the true helix in the direction of revolution approximately half the thickness of a strand, and this will correspond to the departure imposed by the machine upon the last few strands. This intentional slight departure from the theoretical helical or shortest-line path of the cords at certain spaced localities on the inner periphery is insufficient to affect the strength of the tire in any noticeable amount, since the cords are still approximately in their true positions at all points.

While this compensating displacement of the cord-laying finger may be accomplished in various ways, I prefer to accelerate and retard the orbital movement of said finger with reference to its theoretical rate, and it is evident that if, in beginning to lay a ply of cord, this finger is retarded as it rounds the inner side of the mandrel, the displacement of the cord will be upward or in a direction opposite to the direction of revolution of the mandrel, and if it is accelerated in laying the last few turns, the displacement will be in the same direction that the mandrel revolves.

Figure 24:
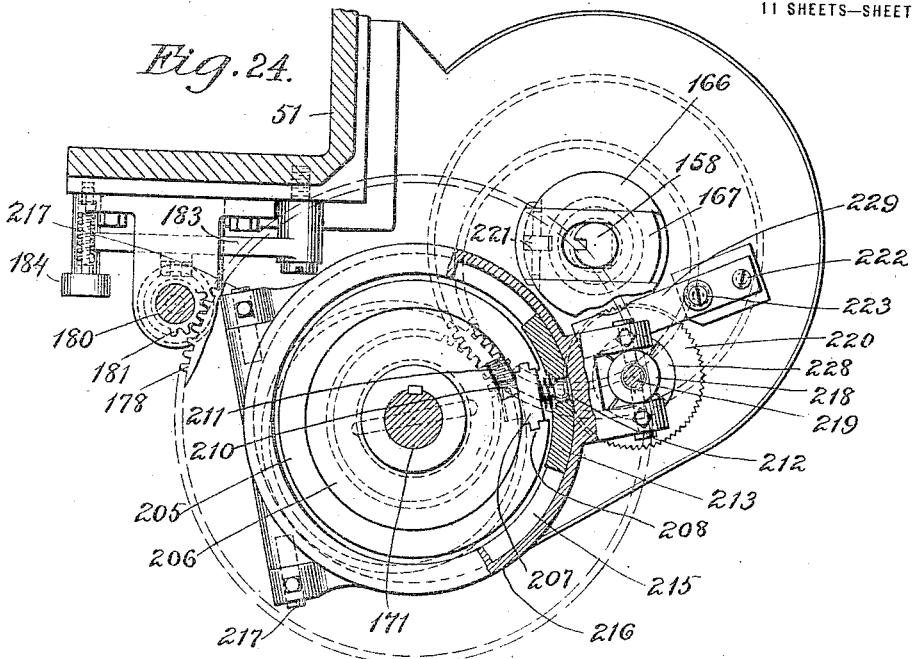
Fig. 24 represents a horizontal section, and Fig. 25 a vertical section, showing the cord-slip compensator.
Figure 25:
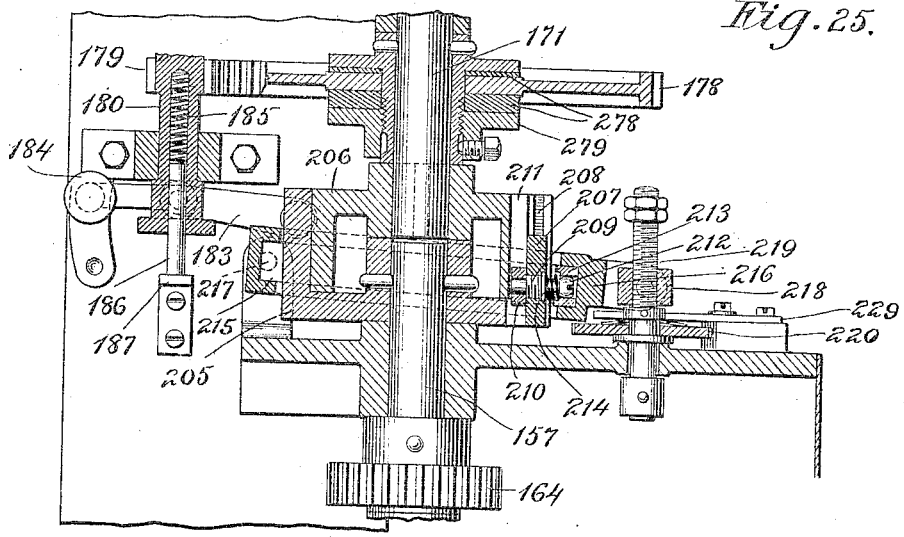
Figure 26:
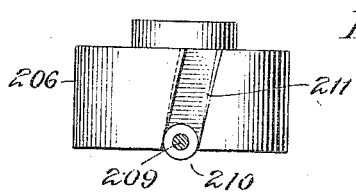
Fig. 26 represents a detail elevation of a part thereof.

The cord-slip compensator is shown principally in Figs. 11, 12, 24, 25 and 26 of the drawings. The shaft-section 157, to which the eccentric gears 161, 162 impart a motion which would result in the cord-laying finger describing a true annular helix about the mandrel, has pinned to its upper end a cupped collar or coupling member 205, and the alined shaft-section 171 has keyed to it another cupped collar or coupling member 206, mounted concentrically within the rim of the lower collar. 207 is a block forming an adjustable member of the shaft coupling and mounted to reciprocate vertically, parallel to the axis of rotation, in guides 208 formed in the collar 205. A stud 209 mounted in said block carries on its inner end a roller 210 which works in a groove 211 formed in the face of collar 206, said groove being inclined to the axis of rotation and equivalent to a portion of a steep-pitched thread-groove. The outer end of the stud has a spherical head 212 occupying an aperture in a segmental slide 213, which, by means of a spring 214 surrounding the neck of the stud, is kept bottomed in an annular guide-way 215 formed in a guide-ring 216. This ring is pivoted at 217, to the fixed standard 51, and is adapted to assume various angular positions coincident with and on either side of a horizontal plane. When the guide-ring 216 is in an inclined position as represented in Fig. 25 for example, slide 213 will travel in an orbit inclined to the horizontal plane, and hence will move the block 207 up and down in its guides 208 a maximum distance equal to half its possible travel, in each rotation of the shaft sections 157, 171; and the corresponding travel of roller 210 in the groove 211 will cause a twisting movement of the shaft-section 171 relative to the shaft-section 157. When the shaft-sections 157, 171 are rotating clockwise, as viewed from above (which is their direction when the first ply is being laid) a descending movement of the blocks 207, 213 in their guides retards the shaft-section 171 relative to the shaft-section 157, and when they rotate in the opposite direction an ascending movement of said blocks retards the shaft-section 171.

A feeding mechanism is provided whereby, in the time that the machine lays a complete layer of cord, the guide ring 216 is automatically moved from one extreme angular position to the opposite extreme. The said mechanism includes a nut 218 swiveled in a fork at the free end of the guide ring and mounted on a vertical screw 219 which is somewhat loosely journaled at its lower end in a suitable fixed bearing in order to allow for the slightly arcuate path of the nut. The screw is provided with a toothed feed wheel 220 intermittently engaged by a pawl 221 (Figs. 11, 12 and 24) which is pivoted at 222 to the knob or handle 166 for sliding the key 165, and which hence revolves with the shaft 158 and is active within the plane of the feed wheel 220 only when the elliptical gears 161, 162 are in action. In other words, this feed pawl is out of operation when cord is being stored upon the spool 31. The angular duration of engagement between the pawl and the feed wheel, and hence the amount which said feed wheel is rotated in each turn of the shaft 158, is determined by a fixed pawl-controlling plate 229 which may be adjusted to a limited extent angularly about a pivot screw 222 and fixed in position by a clamp screw 223 which occupies an enlarged hole (equivalent to a transverse slot) in the plate 229, so that a greater or less number of teeth in the wheel 220 is exposed to the action of the pawl 221 as the latter sweeps along the edge of the plate, the lower arm of the pawl retreating against the pressure of a spring 224 during the feeding action. The travel of nut 218 upon the screw 219 is limited by collars 225, 226, the upper one being a nut held at different adjustment by a check-nut 227. A spring washer 228 between the collar 225 and the surface of the feed wheel 220 furnishes a slipping friction which allows the motion of the feed wheel to continue without rotating the screw after the nut 218 has reached either extreme position.

Shaft 158 rotates in the same direction as the winder, and pawl 221 therefore turns the feed wheel and screw in the opposite direction. If the thread of screw 219 is right-hand, the nut 218 should be started in its lowest position so as to feed upward when the inner ply of cord is being laid, the winder then rotating counter-clockwise. Shaft-sections 157 and 171 make one rotation for one of the winder, and the blocks 207, 213 are on the feeder side of ring 216, as seen in Figs. 24 and 25, when the cord-laying finger 122 is in the middle of the inner side of the mandrel. They are at the opposite or fulcrum 217 side of the ring when the cord-laying finger is in the middle of the outer or tread side of the mandrel as seen with reference to the right-hand finger in Fig. 19. As long as the ring 216 is inclined below the horizontal plane, or, in other words, while the first half of the cord in the inner ply is being laid, block 213, as said finger 122 makes a half-turn about the mandrel from the position shown in Fig. 19, moves from its highest to its lowest position in the ring 216 and hence retards the cord-laying finger relative to its theoretical rate of travel, the maximum displacement of shaft-section 171 being reached as the cord-laying finger reaches the middle of the inner side of the mandrel, after which, during the second half-turn, the shaft-section 171 accelerates and catches up with the shaft-section 157 as the cord-laying finger returns to the middle of the outer side. This accordingly has the effect above described of displacing the inner portions of the turns of cord, relative to a true position, in a direction opposite to the direction of travel of the mandrel. The step-by-step rotation imparted to the screw 19 gradually feeds the nut 218 upwardly and swings the ring 216 to a horizontal position, thereby progressively decreasing the amount of displacement of the cord until it is laid in its true path all around, when half of the ply is in place, after which the ring assumes a progressively increasing angularity above the horizontal plane and the cord-laying finger is relatively accelerated while rounding the inner side of the mandrel, so that the cord will be displaced in the direction of travel of the mandrel on the inner side thereof while the latter half of the ply is being laid.

When the second ply is to be laid, the nut 218 starts at its top position and feeds downwardly, and preliminary to the commencement of this ply the gear 172 is released from key 173, the shaft 171 and its connections rotated a half-turn to bring the second-ply laying-finger into proper relation with the eccentric gears 161, 162, and the key is reëngaged with the gear at the second key-way in the latter, the two keyways being shown at 173ª and 173ᵇ in Fig. 19. The block 213 is thereby brought to the fulcrum side of ring 216 when this cord-laying finger (the one at the left in Fig. 19) is in the middle of the outer or tread side of the mandrel.

Operation.

The operation of the various parts has been set forth quite fully in the above description. To recapitulate: The first thing is to locate a mandrel on the chuck while the cord spool is empty. To open the winder casing, the spool and the winder, the short segments of the winder ring 107 and its gear 108 are brought into register with the short or hinged segment of the winder casing by turning the same manually by means of hand-wheel 177 and gear 172, key 173 being in its upper or clutching position. The short segment of the spool is also lined up by turning the spool by hand until its notch 104 comes opposite the projection 105 on latch-pawl 94, whereupon the heel of the latter may be depressed in order to release its hooked end from the keeper 96. The nut on bolt 92 being screwed back and said bolt turned aside, the hinged segment of the casing is then swung open, as indicated in Figs. 19 and 22, the operator keeping the heel of the latch-pawl depressed until its toe clears the dog 100, after which the spring 97 holds the projection 105 in notch 104 in order to keep the short spool segment in place while the casing is open. At the beginning of the opening movement, the locking pawl 112 automatically engages the short segment of gear 108 and keeps the latter and the attached segments of ring 107 and sleeve 109 from shifting. After the mandrel has been inserted, the casing is closed and automatically locked by the action of dog 100 on the pawl 94, and is further manually locked by the bolt 92. Pawl 112 releases the swinging segment of gear 108 as the casing closes.

Before receiving the first ply of fabric, the mandrel is preferably covered with a thin sheet of rubber, and around the inner periphery there may also be laid a strip or strips of frictioned fabric, which will later assist in binding the tire-bead fillers in place. The preferred starting position of the chuck shown in Fig. 1 may if desired, be determined with the aid of the stop 230. To locate the mandrel upon the chuck, cam 42 is drawn outwardly to the position shown in Fig. 5 by rotating the screw 45 so as to relax the chuck-arms 38, whereupon the inset pieces 55 of the mandrel are registered with the chuck pins 53, the mandrel is supported on the pins of the uppermost arm or arms, and the cam is forced back in order slightly to lift the mandrel, center it, and bring the pins of the remaining chuck arms which rest against the full part of the cam into engagement with the complemental driving members 55 on the mandrel.

The next thing is to wind enough cord on the spool 31 to complete one ply of cord. For this purpose, the shaft 180 is raised to throw the gears 179 and 181 into mesh with the gears 178 and 182 and cause the spool to be driven from the shaft 171. The key 173 is depressed to disconnect the winder drive, and key 165 is raised to disconnect the eccentric gears 161, 162 and cause the shaft 157 to be driven with a uniform motion through the plain gears 163, 164. The cord is led from the source of supply over the pulley 191 and one of the pulleys 188 carried by the distributer nut 189, and its end is attached to the spool by threading it through the holes 31ᵃ therein. The spool is rotated in the reverse direction to that in which it and the cord-laying finger will turn in laying the cord for that ply. Fig. 22 shows the cord being stored for the second ply. The reciprocation of nut 189 by the cross-thread screw 190 as the spool revolves automatically distributes the cord axially of the spool. The number of turns on the spool is indicated on the counter wheel 196, and the operator stops the machine and severs the cord when enough for the ply to be laid has been wound on.

The spool drive is then disconnected and the winder drive is connected by depressing the shaft 180 and the key 165 and raising key 173, bevel gear 154 being in mesh with gear 155 if it is the first ply which is to be laid. Both of the cord-laying fingers 106 being held out of operation, the cord is led from spool 31 around the guide roller 145, feed wheel 147 at the left, and the guide roller 150 at the right as viewed in Fig. 19, and its end is brought under the cord-laying finger 122 at the right. The pin 137 of the latter's arm is then raised to release its lower end from plate 143, and the cord-laying finger is brought close to the surface of the mandrel but preferably held out of contact therewith by the cam 139 until the end of the cord has been stuck to the surface of the rubber sheet on the mandrel and the winder has made six turns about the mandrel, or one complete circuit, whereupon the machine is stopped, the cam 139 is turned out of position, and the supporting member 123 is allowed to rest against the preceding strand which has just been laid, as the winder lays the second and succeeding strands. There is no serious disadvantage, however, in omitting the use of cam 139 for the first strand. After the first strand has been laid, the arm 126 may be attached to the shaft 116 so that its roller 127, acting against the stationary cam 128, imparts pressure to the cord-flattener 125 in rounding the tread surface of the mandrel, and thus the strands are flattened out at the tread as represented in Fig. 30, as they are being laid, and caused more nearly to fill their spaces than they would if left round. Instead of being flattened in the machine, the cords could be flattened at the tread by hand-tooling or otherwise, afterward. It is also obvious that by a simple modification which would be equivalent to making the cord-laying and flattening arms 106, 124 in one piece, the cord-laying finger itself could be made to do the flattening at the tread, although I generally prefer to use a separately mounted and actuated member for this purpose as described. The number of turns of cord which can be laid on a mandrel of given size depends upon the angle of the cords on the inner periphery of the mandrel, it being possible to lay more cords as this angle approaches more nearly to a right-angle. Consequently the cord-flattener is of use particularly in connection with the eccentric-gear drive for the winder parts, which lays the cords at substantially the same angle on both inner and outer peripheries, as previously described.

The eccentric gears 161, 162 begin to accelerate the cord-laying finger in the middle of the inner side of the mandrel and begin to retard in the middle of the tread portion, and thereby cause the cord to be laid approximately on the shortest line that it can occupy on the surface of the mandrel for a given pitch. Also the cord-slip compensator shown in Figs. 24, 25 and 26 operates in the manner previously set forth, so that during the laying of the first half of the total number of strands, while nut 218 travels half-way up the feed-screw 219, the action of the roller 210 in the inclined groove 211 causes a turning movement of shaft 171 with reference to the shaft section 157 so as to retard the cord-laying finger on the inner side of the mandrel and displace the turns on this side by progressively-decreasing amounts in a direction opposite to the travel of the mandrel until the middle strand is reached, after which there is an acceleration of the cord-laying finger in rounding the inner side of the mandrel so as to displace the turns at this point by progressively-increasing amounts in the direction of the travel of the mandrel until the last turns are laid, whereby the slip is allowed for and enough room is left on the inside for the last six turns forming the final strand of cord in that layer.

After the first layer of cord has been wound in place, the mandrel is taken out and another one may be inserted to have the same operations repeated, or the same or a similar mandrel with the first cord layer thereon may be inserted, and the winder reversed so as to lay the second cord layer in the opposite direction. For the second layer, the cord is wound on the spool in the direction illustrated in Fig. 22, the cord-laying finger at the left as viewed in Fig. 19 instead of the one at the right is brought into use, and the cord is led in the opposite way around the guide-roller 145, the right-hand feed wheel 147 and the left-hand guide-roller 150.

While the mandrel bearing the first cord layer is out of the machine, a thin sheet of uncured rubber is laid over the cords and the bead fillers 234 (shown in Figs. 28 and 29 as for a straight-side tire but adapted to be of any usual or suitable shape) are applied, after which the second ply is wound in place, in the manner described, over the first ply and over the bead fillers. At any suitable time after the second ply of cord is wrapped in place, and preferably while the tire is still in the machine, both plies are cut through circumferentially on the inner side, preferably along two lines so as to sever the waste-strip 235 shown in dotted lines in Fig. 29. Strips of rubberized fabric (not here shown) such as are commonly used in cord-tire manufacture, may be applied to enwrap the beads. The complete carcass may then have the rubber side-strips, breaker-strip and tread applied and be cured in the usual manner.

I claim:

1. In a ring-mandrel winding machine, the combination of an annular mandrel having circumferentially-spaced driving members, means having similarly-spaced complemental driving members adapted to support and revolve the mandrel in a vertical plane; and means for helically winding the mandrel.

2. In a ring-mandrel winding machine, the combination of an annular mandrel having circumferentially-spaced driving recesses, means having similarly-spaced driving projections adapted to support and revolve the mandrel in a vertical plane, and means for helically winding the mandrel.

3. In a ring-mandrel winding machine, the combination of an annular mandrel, a series of positive driving elements adapted to revolve said member, mandrel-winding means adapted to revolve about the mandrel in a plane transverse thereto, means for imparting a movement of translation to said driving elements to revolve the mandrel, and means for automatically retracting said elements successively from the mandrel in passing the winding means and automatically returning them successively into driving relation therewith.

4. In a ring-mandrel winding machine, the combination of an annular mandrel, a series of mandrel-driving elements adapted to engage the mandrel on the inner periphery thereof, means for imparting a movement of translation to said elements to revolve the mandrel, and means for automatically retracting said elements inwardly in succession as they pass a given point.

5. In a ring-mandrel winding machine, the combination of an annular mandrel having circumferentially-spaced driving members, mandrel-revolving means having similarly-spaced complemental driving members adapted to support said mandrel in a fixed vertical plane, an orbital winder, and positive gearing connecting said winder with the mandrel-revolving means.

6. In a ring-mandrel winding machine, the combination of an annular mandrel, a rotary chuck-shaft and head, gripping members movably mounted on said head and adapted to support the mandrel by its inner periphery and revolve the same, and means for automatically retracting said members in passing a given point.

7. In a ring-mandrel winding machine, the combination of an annular mandrel, a rotary chuck-shaft and head, a series of chuck-arms pivoted to said head for supporting and revolving the mandrel by its inner periphery, and means for automatically retracting said arms in passing a given point.

8. In a ring-mandrel winding machine, the combination of a revolving series of mandrel-supporting and driving elements having an outward movement to engage the mandrel and an inward movement to release the same, and a cam structure having portions adapted to produce said inward and outward movements.

9. In a ring-mandrel winding machine, the combination of an annular mandrel, a stationarily-mounted cam having a concentric circular portion and an inwardly-retreating portion, a series of driving elements controlled by said cam and adapted to engage the inner periphery of said mandrel, and means for revolving said elements about the cam.

10. In a ring-mandrel winding machine, the combination of a rotary chuck-shaft and head, a group of mandrel-engaging arms pivoted to said head, and a cam stationarily mounted within said group of arms for controlling the same, said cam having a concentric portion and a retreating portion.

11. In a ring-mandrel winding machine, the combination of an annular mandrel, a revolving series of chuck-arms adapted to support the same from within, and a stationarily-mounted cam having an arm-projecting portion and a retreating portion, said cam being axially movable to withdraw its support from the projected arms.

12. In a ring-mandrel winding machine, the combination of an annular mandrel, a revolving series of chuck-members for supporting said mandrel by its inner periphery, a cam on the inner side of the path of said arms for projecting the same into engagement with the mandrel, and a guide on the outer side of said path for retracting the arms successively in passing a given point.

13. In a ring-mandrel winding machine, the combination of a revolving series of chuck-elements for supporting an annular mandrel by its inner periphery, means for retracting said elements successively in passing a given point, means for projecting said elements into mandrel-engaging position, and resilient means permitting said elements to yield in their projected position.

14. In a ring-mandrel winding machine, the combination of a mandrel winder, a revolving series of chuck-arms, spring-backed mandrel-supporting pins on said arms, and means for automatically projecting and retracting said arms successively in a radial direction in passing the winder.

15. In a ring-mandrel winding machine, the combination of a rotary chuck having a series of mandrel-supporting members, an annular mandrel supported thereby, stationarily mounted means for winding cord helically on said mandrel, and a stop movable into and out of operative position for holding the chuck temporarily with its mandrel-supporting members in a predetermined angular position with reference to the winding means.

16. In a ringing-mandrel winding machine, the combination of a rotary chuck having a series of mandrel-supporting arms, mandrel-winding means, and an adjustable chuck-stop adapted to coöperate with any one of said arms.

17. In a ring-mandrel winding machine, the combination of an annular mandrel, a winder having an orbital movement about said mandrel, means for imparting a relative movement to the two circumferentially of the mandrel, and means for imparting a relative acceleration and retardation to the mandrel and winder in one of said movements for causing the latter to wind in approximately the shortest path for a given pitch on said mandrel.

18. In a ring-mandrel winding machine, the combination of an annular mandrel, a winder, means for relatively moving the two circumferentially of the mandrel, and means for imparting to the winder a fast and slow orbital movement about the mandrel.

19. In a ring-mandrel winding machine, the combination of an annular mandrel, means for revolving the same, a winder having an orbital movement about said mandrel, and eccentric gearing adapted to revolve said winder at a relatively slow rate as it turns the inner periphery of the mandrel and at a relatively fast rate as it turns the outer periphery thereof.

20. In a ring-mandrel winding machine, the combination of an annular mandrel, means for revolving the same, a winder having an orbital movement about said mandrel, shafting and gearing for driving said winder including driving and driven shafts, a counter-shaft, means for rotating the driving and counter shafts at uniform angular speeds, and a pair of eccentric gears connecting the counter-shafts with the driven shaft.

21. In a ring-mandrel winding machine, the combination of an annular mandrel, means for winding cord in circumferentially-spaced convolutions about said mandrel, and means for flattening the cord on the outer periphery only of the mandrel.

22. In a ring-mandrel winding machine, the combination of an annular mandrel, means for winding cord thereon in successive turns to form a layer, and means for flattening each turn on the outer periphery of the mandrel as it is being laid.

23. In a ring-mandrel winding machine, the combination of an annular mandrel, means for winding cord thereon, and means for compacting the strands circumferentially on the inner side of the mandrel.

24. In a ring-mandrel winding machine, the combination of an annular mandrel, means for winding cord thereon, means for compacting the strands circumferentially on the inner side of the mandrel, and means for flattening them on the outer side of the mandrel.

25. In a ring-mandrel winding machine, the combination of an annular mandrel, means for winding cord thereon, means for imparting an inward pressure to each turn as it is being laid, the pressure beginning at one side of the cord and progressively increasing to a maximum at the middle of the tread and progressively decreasing to the opposite side.

26. In a ring-mandrel winding machine, the combination of an annular mandrel, means for winding cord in successive convolutions about said mandrel, and an orbitally-movable cord flattener which is active on the outer and inactive on the inner periphery of the mandrel.

27. In a ring-mandrel winding machine, the combination of an annular mandrel, means for winding cord in successive convolutions around said mandrel, an orbitally-movable cord flattener, and means for yieldingly pressing said flattener inwardly against the cord as it turns the outer periphery of the mandrel.

28. In a ring-mandrel winding machine, the combination of an annular mandrel, means for revolving the same, a cord-laying finger having an orbital movement about said mandrel and adjustable toward and from the surface of the latter, and an orbitally-movable cord flattener separately adjustable toward and from the surface of the mandrel.

29. In a ring-mandrel winding machine, the combination of an annular mandrel, means for winding cord in a substantially-helical path on said mandrel, an orbitally-movable cord flattener, and means including a stationary semi-annular cam for imparting a yielding inward pressure to said flattener as it rounds the outer periphery of the mandrel.

30. In a ring-mandrel winding machine, the combination of an annular mandrel, means for revolving the same, and an orbitally-movable cord-laying finger adapted to contact with the cord both radially and circumferentially of the mandrel substantially at the point where said cord winds upon the surface of the mandrel or its covering layer.

31. In a ring-mandrel winding machine, the combination of an annular mandrel, means for revolving the same continuously through a complete turn, an orbitally-movable winder having a plurality of alternately-operative cord-laying members, and means for reversing the relative winding movement of said mandrel and winder at the end of a revolution of the mandrel so as to lay a plurality of complete plies of the cord in overlying, oppositely-inclined, substantially-helical paths.

32. In a ring-mandrel winding machine, the combination of an annular mandrel, means for revolving the same, and a winder including a support mounted to revolve about said mandrel, and an arm pivoted to said support and having a cord-laying finger at its free end adapted to crowd each turn circumferentially against the preceding turn at the point of tangency of the onrunning cord on the inner periphery of the mandrel.

33. In a ring-mandrel winding machine, the combination of an annular mandrel, an orbitally-movable winder having a plurality of alternately-operative cord-laying members in different angular locations thereon, a gear for revolving said winder, a shaft for rotating said gear, and means for keying said shaft to its gear in a plurality of angular positions.

34. In a ring-mandrel winding machine, the combination of an annular mandrel, and a winder including an orbitally-movable support, a cord laying arm pivoted thereto and having a cord-laying finger at its free end, a pin on said arm slidable into and out of engagement with a shoulder on said support to hold the cord-laying finger out of operative position, and a cam on said pin operated by turning the latter for holding the cord-laying finger in a preliminary operative position adjacent to but out of contact with the mandrel surface.

35. In a ring-mandrel winding machine, the combination of an annular mandrel, a winder casing surrounding a limb of the mandrel and made in segments so as to be opened and closed to admit the passage of the latter, an annular revolving element in said casing also made in segments, and a lock for the casing controlled by the angular position of said element.

36. In a ring-mandrel winding machine, the combination of an annular mandrel, a winder casing embracig a limb of said madrel and made in segments so as to be opened and closed to admit the passage of the latter, a revolving winder in said casing, a revolving cord spool in the casing embracing the mandrel and also made in segments, and a latch for said casing controlled by the angular position of said spool and adapted to be opened when the segments of the spool and casing are properly registered to permit the casing to be opened.

37. In a ring-mandrel winding machine, the combination of an annular mandrel, a winder casing and a cord spool therein both made in segments and embracing a limb of the mandrel, a spring-opened latch controlled by the angular position of the spool and adapted to lock the casing in closed position, and a spring-pressed dog operative on closure of the casing for closing said latch and adapted to be displaced by the manual retraction of the latch when such retraction is permitted by the angular position of the spool.

38. In a ring-mandrel winding machine, the combination of a winder casing embracing a limb of said mandrel and made in segments so as to be opened and closed to admit the passage of the latter, a revolving ring in said casing also made in segments, and means operated by the opening and closing of said casing for locking and unlocking a segment of said ring on the casing.

39. In a ring-mandrel winding machine, the combination of an annular mandrel, a winder casing embracing a limb of said mandrel and made in segments so as to be opened and closed to admit the passage of the latter, a winder ring mounted to revolve in said casing and having a gear on its periphery, said ring and gear being in segments, and a latch-pawl pivoted to the casing and spring-pressed to engage between the teeth of said gear, said pawl being automatically retracted by the closure of the casing.

40. In a ring-mandrel winding machine, the combination of an annular mandrel, a winder casing embracing a limb of said mandrel and made in segments so as to be opened and closed to admit the passage of the latter, an orbitally-movable winder mounted in said casing, an orbitally-movable cord flattener, and a cord-flattener cam mounted on the casing and made in segments corresponding to the casing segments.

41. In a ring-mandrel winding machine, the combination of an annular mandrel, means for revolving the same in a single direction, a plurality of alternately-operative orbitally-movable cord-laying members, a plurality of alternately-operative orbitally-movable cord flatteners, and means for revolving said winder and said flatteners in either direction.

42. In a ring-mandrel winding machine, the combination of a revolving annular mandrel, an orbitally-movable winder, an annular cord spool surrounding said mandrel and normally adapted to turn freely, and means for revolving said spool independently of the winder to store cord thereon while the winder remains idle.

43. In a ring-mandrel winding machine, the combination of a revolving annular mandrel, an orbitally-movable winder, a spool for supplying cord to said winder, a shaft for driving said winder and spool, and means for gearing said shaft alternately to the winder and the spool.

44. In a ring-mandrel winding machine, the combination of an annular revolving mandrel, an orbitally-movable winder, a cord spool, a shaft and two sets of gears for driving said winder and spool, means for rendering either set of gears operative at will, and a frictional connection in the spool-driving set for allowing the shaft to slip relatively to the spool.

45. In a ring-mandrel winding machine, the combination of an annular revolving mandrel, an orbitally-movable winder, a cord spool normally adapted to turn freely, means for positively rotating said spool to store cord thereon, a cord-guiding distributer, and means for automatically reciprocating said distributer lengthwise of the spool.

46. In a ring-mandrel winding machine, the combination of a revolving annular mandrel, an orbitally-movable winder, a cord spool normally adapted to turn freely, a shaft and gearing for driving said winder and for positively rotating the spool to store cord thereon, a cross-thread screw on said shaft, and a distributer nut automatically reciprocated by said screw and having a cord guide.

47. In a ring-mandrel winding machine, the combination of a revolving annular mandrel, an orbitally-movable winder, an annular cord spool surrounding the mandrel and normally adapted to turn freely, said spool having a cam, a toothed counter-wheel, and a pawl operated by the cam for turning said counter-wheel step by step.

48. In a ring-mandrel winding machine, the combination of an annular mandrel, means for revolving the same, means for winding cord about said mandrel in a series of circumferentially-adjacent substantially-helical courses, and means for progressively displacing the cord circumferentially from its theoretical position on the inner side of the mandrel, a fraction of the width of a strand at a time in successive turns, to allow for slip on the mandrel.

49. In a ring-mandrel winding machine, the combination of an annular mandrel, means for revolving the same, an orbitally-movable cord-winding member, means for positively revolving said mandrel and member in a predetermined speed ratio, means for causing said member to trace approximately the shortest helical path on said mandrel for the given pitch, and means for displacing the cord circumferentially from its theoretical position on the inner side of the mandrel by successive increments aggregating substantially the spacing of adjacent turns, to allow for slip on the mandrel.

50. In a ring-mandrel winding machine, the combination of an annular mandrel, means for revolving the same, an orbitally-movable winder, and driving means therefor including a posterior shaft section geared to said winder, an alined anterior shaft section, and a coupling for said sections having means for automatically accelerating and retarding the posterior section relatively to the anterior section.

51. In a ring-mandrel winding machine, the combination of an annular mandrel, means for revolving the same, an orbitally-movable winder, and winder-driving mechanism having means for moving said winder relatively slow as it turns the inner side and relatively fast as it turns the outer side of the mandrel, and having other means for displacing the position of the winder as it turns the inner side of the mandrel by successive small increments in a circumferential direction relative to its position for the theoretically correct pitch-spacing of the cord.

52. In a ring-mandrel winding machine, the combination of an annular mandrel, means for revolving the same, an orbitally-movable winder, and winder-driving mechanism including alined anterior and posterior shaft sections, a coupling therefor having a member adjustable to vary the angular relation of said shaft sections, and means for automatically reciprocating said member by varying amounts in successive rotations of said shaft sections.

53. In a ring-mandrel winding machine, the combination of an annular mandrel, means for revolving the same, an orbitally-movable winder, and winder-driving mechanism including alined anterior and posterior shaft sections, a coupling therefor having a reciprocating member to vary the angular relation of said sections, a pivoted annular guide for said member surrounding the coupling, and means for progressively varying the angularity of said guide.

54. In a ring-mandrel winding machine, the combination of an annular mandrel, means for revolving the same, an orbitally-movable winder, and winder-driving mechanism including alined anterior and posterior shaft sections, a coupling therefor having a reciprocating member to vary the angular relation of said sections, an annular guide for said member surrounding the coupling and pivoted to a fixed support at one side of the latter, a nut at the side opposite the pivot, a screw engaging the nut and held against axial movement, and means for automatically rotating said screw step by step.

55. In a ring winding machine, a support for holding and rotating the ring shaped article to be wound, a bobbin spool encircling the article, a ring shaped winding plate associated with one side of said bobbin for driving it to wind thread thereon, a ring shaped laying plate associated with the other side of said bobbin to unwind cord therefrom and wind it about the article, and means for rotating either of said plates at will.

56. In a ring winding machine, a support for holding and rotating an article to be wound, annular winding means encircling said article, and means for rotating said winding means with an alternately accelerated and retarded motion during each rotation.

57. In a ring winding machine, a support for holding and rotating an article to be wound, annular winding means encircling said article, and eccentric gearing for rotating said winding means.

In testimony whereof I have hereunto set my hand this 26th day of November 1915.

FRANCIS B. CONVERSE.